(12) United States Patent
Lu et al.

(10) Patent No.: US 8,923,001 B2
(45) Date of Patent: Dec. 30, 2014

(54) CHIP CARD PROTECTING COVER ASSEMBLY AND ELECTRONIC DEVICE USING SAME

(75) Inventors: Yu-Lun Lu, Tu-Cheng (TW);
Chueh-Chuan Chen, Tu-Cheng (TW);
Kun-Ying Lin, Tu-Cheng (TW);
Chih-Chun Tsai, Tu-Cheng (TW);
Po-Wen Kuo, Tu-Cheng (TW);
Chih-Yung Wu, Tu-Cheng (TW);
Po-Ching Huang, Tu-Cheng (TW)

(73) Assignee: Chi Mei Communications Systems, Inc., New Taipei (TW)

( * ) Notice: Subject to any disclaimer, the term of this patent is extended or adjusted under 35 U.S.C. 154(b) by 261 days.

(21) Appl. No.: 13/457,721

(22) Filed: Apr. 27, 2012

(65) Prior Publication Data
US 2013/0235511 A1 Sep. 12, 2013

(30) Foreign Application Priority Data
Mar. 8, 2012 (CN) .......................... 2012 1 0059690

(51) Int. Cl.
*H05K 7/00* (2006.01)

(52) U.S. Cl.
USPC .......................................... 361/728; 361/755

(58) Field of Classification Search
USPC .................... 361/728–730, 755, 796, 800; 335/302–306
See application file for complete search history.

(56) References Cited

U.S. PATENT DOCUMENTS

| | | | |
|---|---|---|---|
| 6,630,878 B2 * | 10/2003 | Pan et al. ....................... | 335/285 |
| 6,653,919 B2 * | 11/2003 | Shih-Chung et al. ......... | 335/207 |
| 8,423,098 B2 * | 4/2013 | Chen ........................... | 455/575.4 |
| 2008/0278269 A1 * | 11/2008 | Ramirez et al. ............... | 335/205 |
| 2011/0157791 A1 * | 6/2011 | Park et al. ................. | 361/679.01 |
| 2013/0286551 A1 * | 10/2013 | Ashcraft et al. .......... | 361/679.01 |

FOREIGN PATENT DOCUMENTS

TW            1327886            7/2010

* cited by examiner

*Primary Examiner* — Hung S Bui
(74) *Attorney, Agent, or Firm* — Novak Druce Connolly Bove + Quigg LLP

(57) ABSTRACT

An electronic device includes a housing, a chip card received in the housing, and a chip card protecting cover assembly. The chip card protecting cover assembly includes a housing, a first magnet and a second magnet. The magnetic force between the first magnet and the second magnet drives the protecting cover to rotate relative to the housing, thereby covering or exposing the chip card.

13 Claims, 4 Drawing Sheets

CHIP CARD PROTECTING COVER ASSEMBLY AND ELECTRONIC DEVICE USING SAME

BACKGROUND

1. Technical Field

The present disclosure relates to chip card protecting cover assemblies, and particularly to a chip card protecting cover assembly for a portable electronic device.

2. Description of Related Art

Typical chip card, such as a subscriber identity module (SIM) card or secure digital memory card (SD) card is fixed to a housing of a hand-held device with a card door for preventing the chip card from falling out of the device. However, to open the door, a slot for finger grasping is needed, which affects the appearance of the housing.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card protecting cover assembly and portable electronic device with the chip card protecting cover assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
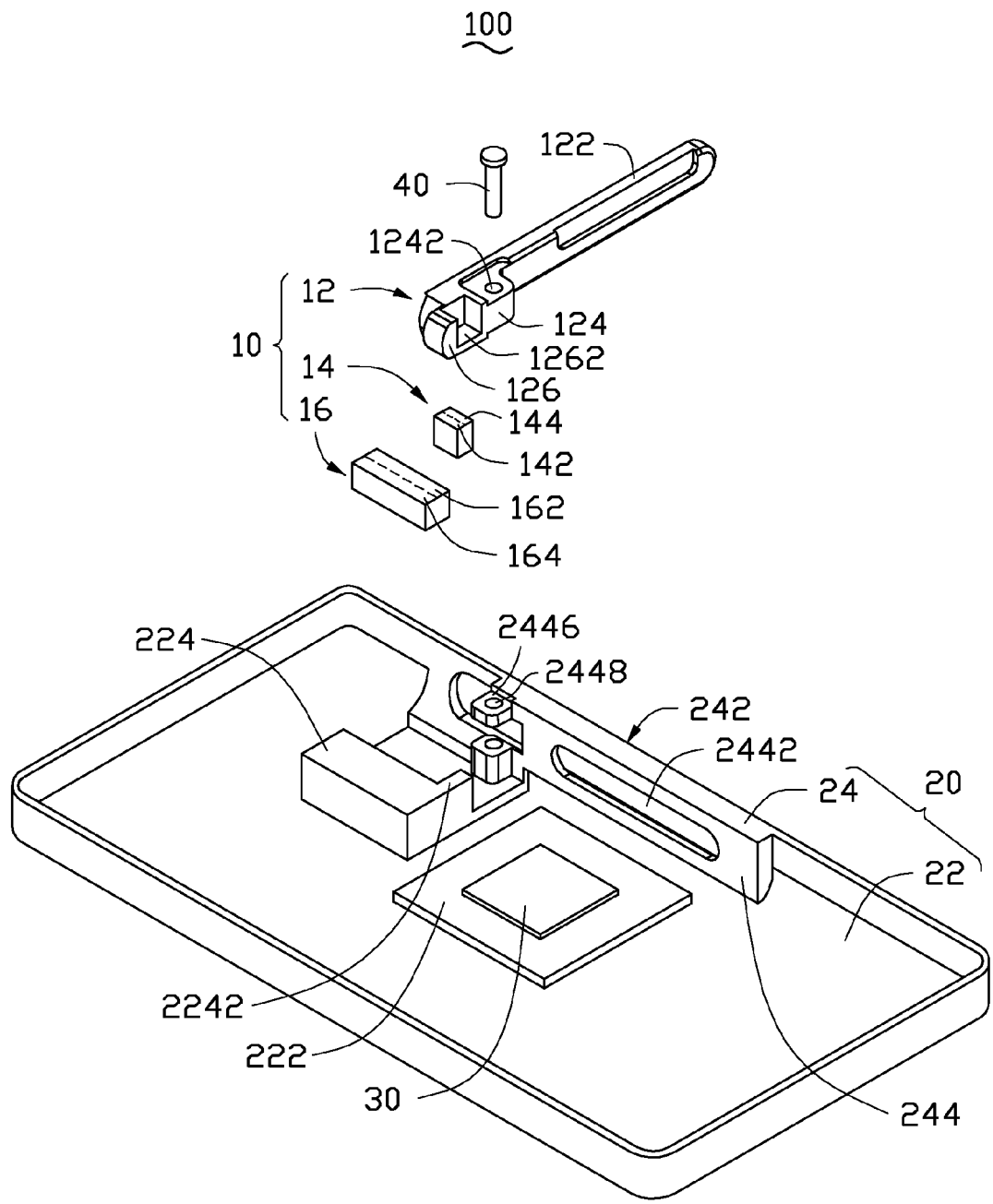
FIG. 1 is an exploded view of one embodiment of a chip card protecting cover assembly used in an electronic device.
Figure 2:
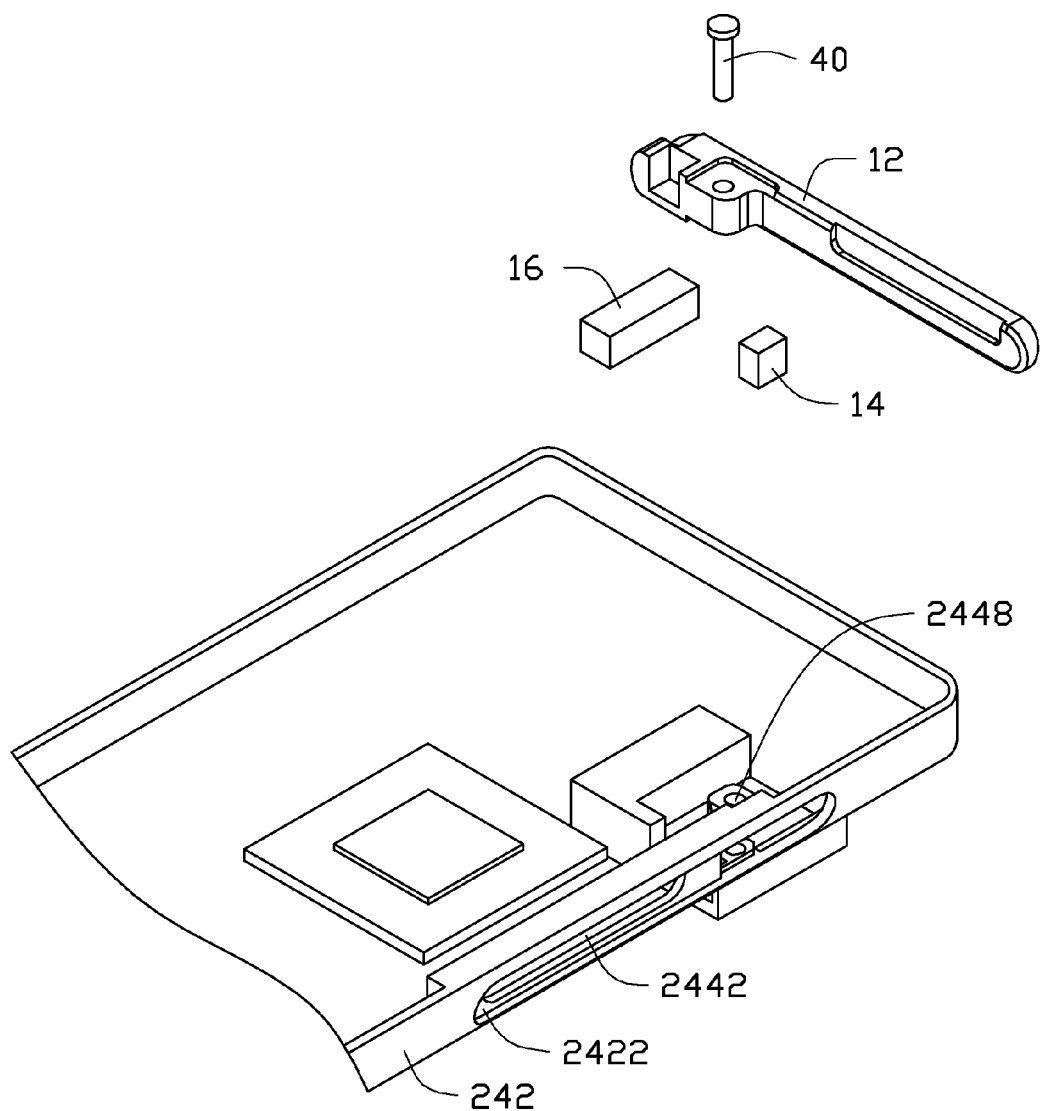
FIG. 2 is similar to FIG. 1, but viewing from anther aspect.

Referring to FIGS. 1 and 2, an exemplary embodiment of an electronic device 100, such as mobile phone, includes a chip card protecting cover assembly 10, a housing 20 and a chip card 30. The chip card 30 is detachably attached within the housing 20. The cover assembly 10 covers the chip card insertion hole in the housing 20. The chip card 30 may be a subscriber identity module (SIM) card or a secure digital memory card (SD).

The cover assembly 10 includes a protecting cover 12, a first magnet 14 and a second magnet 16.

The protecting cover 12 includes a cover body 122, a joint 124 protruding from one end of the cover body 122, and a retaining block 126 protruding from a distal end of the joint 124 opposite to the cover body 122. In other words, the cover body 122 and the retaining block 126 are located at opposite ends of the joint 124. The joint 124 is rotatably attached to the housing 20 so the protecting cover 12 is rotatably assembled to the housing 20. The retaining block 126 defines a retaining slot 1262, in which the first magnet 14 is fixed.

The first magnet 14 includes a first north pole 142 and a first south pole 144. The second magnet 16 includes a second north pole 162 and a second south pole 164.

The housing 20 includes a main board 22 and a sidewall 24 protruding from main board 22. The main board 22 includes a receiving plate 222 and a retaining plate 224. The chip card 30 is received in the receiving plate 222. The retaining plate 224 is used to fix the second magnet 16. A limiting block 2242 protrudes from the retaining plate 224, to limit a rotation maximum of the protecting cover 12 relative to the housing 20.

The sidewall 24 includes an outer surface 242 and an inner surface 244 opposite to the outer surface 242. A receiving groove 2422 is defined in the outer surface 242, in which the protecting cover 12 is received. An card insertion hole 2442 is defined in the inner surface 244. The card insertion hole 2442 is opposite to the receiving plate 222 and communicates with the receiving groove 2422. The chip card 30 is inserted into the receiving plate 222 through the card insertion hole 2442.

In this exemplary embodiment, a way of enabling the joint 124 rotating relative to the housing 20 may be as follows: two protrusions 2446 protrude from the inner surface 244 and are located opposite sides of the receiving groove 2422, each protrusion 2446 defines a rotation hole 2448; the joint 124 defines a shaft hole 1242; a shaft 40 is inserted in the rotation holes 2448 and the shaft hole 1242 so the joint 124 can rotate relative to the housing 20 about the shaft 40.

Figure 3:
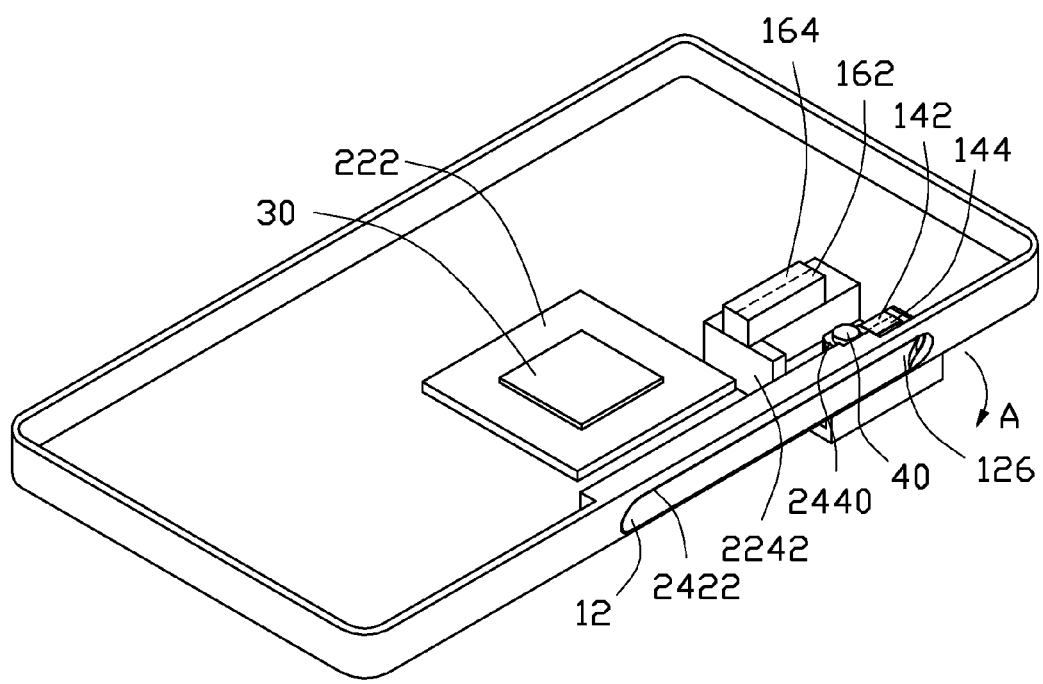
FIG. 3 is an assembled view of the electronic device in a first state.

Referring to FIG. 3, in assembly, the first magnet 14 is fixed in the retaining slot 1262. The second magnet 16 is fixed to the retaining plate 224. The chip card 30 is inserted in the receiving plate 222 through the card insertion hole 2442. The protecting cover 12 is received in the receiving groove 2422. At this time, the first north pole 142 is opposite to the second north pole 162, the first south pole 144 is opposite to the second south pole 164; the cover body 122 covers the card insertion hole 2442, the joint 124 is located between the protrusions 2446 with the rotation holes 2448 aligned with the shaft hole 1242. The shaft 40 is inserted into the rotation hole 2448 and the shaft hole 1242 so the joint 124 is rotatably fixed to the housing 20, to yield an assembled electronic device 100. Because the first north pole 142 is opposite to the second north pole 162, a repulsive force is generated between the first north pole 142 and the second north pole 162, driving the protecting cover 12 rotating in a clockwise A (FIG. 3), which makes the cover body 122 firmly cover the card insertion hole 2442.

Figure 4:
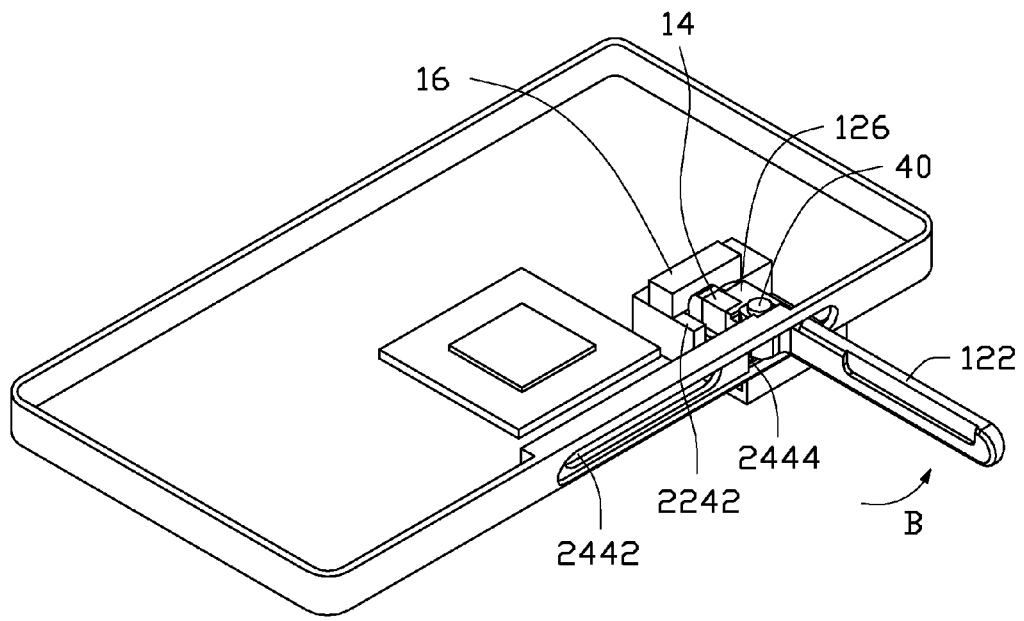
FIG. 4 is similar to FIG. 3, but showing the electronic device in a second state.

Referring to FIG. 4, to open the protecting cover 12, the retaining block 126 is pressed to rotate the retaining block 126 entering into the housing 20 under overcoming the repulsive force between the first north pole 142 and the second north pole 162. As the retaining block 126 rotates, the repulsive force between the first magnet 14 and the second magnet 16 gradually becomes smaller, but an attractive force between the first north and the second magnet 16 gradually becomes larger. Once the attractive force between the first magnet 14 and the second magnet 16 is larger than the repulsive force between the first magnet 14 and the second magnet 16 the protecting cover 12 automatically opens in a counter clockwise B (FIG. 4) under the attractive force between the first magnet 14 and the second magnet 16, until the retaining block 126 is limited by the limiting block 242. At this time, the attractive force between the first magnet 14 and the second magnet 16 make the protecting cover 12 have a tendency of continuously rotating in the counter clockwise B, which makes the cover body 122 firmly be located in an opened state to open the card insertion hole 2442, where the chip card 30 can be exchanged.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card protecting cover assembly for covering a chip card insertion hole of a housing, the chip card protecting cover assembly comprising:
   a protecting cover rotatably assembled to the housing;
   a first magnet;
   a second magnet;
   wherein a magnetic force between the first magnet and the second magnet drives the protecting cover to rotate relative to the housing, thereby covering or exposing the insertion hole; and
   wherein the first magnet includes a first north pole and a first south pole, the second magnet includes a second north pole and a second south pole; when the protecting cover covers the chip card, the first north pole faces the second north pole, the first south pole is opposite to the second south pole, when the protecting cover exposes a chip card, the first north pole and the first south pole are both opposite to the second north pole.

2. The chip card protecting cover assembly of claim 1, wherein the protecting cover includes a joint, the joint is rotatably attached to the housing so the protecting cover is rotatably assembled to the housing.

3. The chip card protecting cover assembly of claim 2, wherein the protecting cover further includes a cover body and a retaining block, the cover body and the retaining block are located at opposite ends of the joint, when the cover body covers the chip card, the first magnet is fixed to the retaining block.

4. The chip card protecting cover assembly of claim 3, wherein the retaining block defines a retaining slot, in which the first magnet is fixed.

5. An electronic device, comprising:
   a housing defining a chip insertion hole;
   a chip card protecting cover assembly comprising:
      a protecting cover;
      a first magnet;
      a second magnet;
      wherein a magnetic force between the first magnet and the second magnet drives the protecting cover to rotate relative to the housing, thereby covering or exposing the chip card insertion hole; and
      wherein the first magnet includes a first north pole and a first south pole, the second magnet includes a second north pole and a second south pole; when the protecting cover covers the chip card insertion hole, the first north pole faces the second north pole, the first south pole is opposite to the second south pole, when the srotectin cover exposes the chip card insertion hole, the first north pole and the first south pole are both opposite to the second north pole.

6. The electronic device assembly of claim 5, wherein the protecting cover includes a joint, the joint is rotatably fixed to the housing so the protecting cover is rotatably fixed to the housing.

7. The electronic device of claim 6, wherein the protecting cover further includes a cover body and a retaining block, the cover body and the retaining block are located at opposite ends of the joint, the cover body covers the chip card insertion hole, the first magnet is fixed to the retaining block.

8. The electronic device assembly of claim 7, wherein the retaining block defines a retaining slot, in which the first magnet is fixed.

9. The electronic device assembly of claim 7, wherein the housing includes a main board and a sidewall protruding from main board, the main board includes a receiving plate and a retaining plate, a chip card is received in the receiving plate, the second magnet is fixed to the retaining plate.

10. The electronic device assembly of claim 9, wherein a limiting block protrudes from the retaining plate, to limit a rotation maximum of the protecting cover relative to the housing.

11. The electronic device assembly of claim 10, wherein the sidewall includes an outer surface, a receiving groove is defined in the outer surface, in which the protecting cover is received.

12. The electronic device assembly of claim 11, wherein the sidewall further includes an inner surface opposite to the outer surface, the card insertion hole is defined in the inner surface, the card insertion hole is opposite to the receiving plate and communicates with the receiving groove, a chip card is inserted into the receiving plate through the card insertion hole.

13. The electronic device assembly of claim 12, wherein two protrusions protrude from the inner surface and are located two sides of the receiving groove, each protrusion defines a rotation hole; the joint defines a shaft hole; a shaft is inserted in the rotation holes and the shaft hole so the joint is capable of rotating relative to the housing about the shaft.

* * * * *